US010914593B2

(12) United States Patent
Cremer et al.

(10) Patent No.: US 10,914,593 B2
(45) Date of Patent: *Feb. 9, 2021

(54) DYNAMIC CONTENT DELIVERY BASED ON VEHICLE NAVIGATIONAL ATTRIBUTES

(71) Applicant: Gracenote, Inc., Emeryville, CA (US)

(72) Inventors: Markus K. Cremer, Orinda, CA (US); Suresh Jeyachandran, Alameda, CA (US); Paul Emmanuel Quinn, Kensington, CA (US); Roger Tsai, Emeryville, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,573

(22) Filed: Aug. 22, 2019

(65) Prior Publication Data
US 2019/0376794 A1 Dec. 12, 2019

Related U.S. Application Data

(63) Continuation of application No. 15/380,950, filed on Dec. 15, 2016, now Pat. No. 10,393,530.

(51) Int. Cl.
*G06F 15/16* (2006.01)
*G01C 21/26* (2006.01)
(Continued)

(52) U.S. Cl.
CPC ............. *G01C 21/26* (2013.01); *B60W 40/08* (2013.01); *G01C 21/3697* (2013.01);
(Continued)

(58) Field of Classification Search
CPC ........ H04W 4/046; H04L 67/18; H04L 67/22; H04L 67/12; H04L 67/306; G01C 21/26;
(Continued)

(56) References Cited

U.S. PATENT DOCUMENTS 5,014,206 A 5/1991 Scribner et al.
5,150,116 A 9/1992 West
(Continued)

OTHER PUBLICATIONS

U.S. Department of Transportation "The Impact of Driver Inattention on Near-Crash/Crash Risk: An Analysis Using the 100-Car Naturalistic Driving Study Data," National Highway Traffic Safety Administration, Apr. 2006, 224 pages. Available <http://hdl.handle.net/10919/55090>.
(Continued)

*Primary Examiner* — Richard G Keehn
(74) *Attorney, Agent, or Firm* — Hanley, Flight & Zimmerman, LLC

(57) ABSTRACT

Systems and methods are disclosed for dynamic content delivery based on vehicle navigational attributes. An example system includes at least one processor, and memory including instructions that, when executed, cause the at least one processor to determine a relevancy score for respective ones of a plurality of sporting event data items based on navigational attributes of a vehicle, determine whether the navigational attributes correspond to a driving condition, the driving condition indicative of a driving pattern of the vehicle in response to a condition external to the vehicle, and in response to determining that the navigational attributes correspond to the driving condition, present a first sporting event data item of the plurality of sporting event data items in response to a relevancy score of the first sporting event data item corresponding to the driving condition.

20 Claims, 8 Drawing Sheets

(51) Int. Cl.

| | |
|---|---|
| *H04L 29/08* | (2006.01) |
| *B60W 40/08* | (2012.01) |
| *G06F 16/9535* | (2019.01) |
| *G06F 16/9537* | (2019.01) |
| *G06F 16/2457* | (2019.01) |
| *H04W 4/021* | (2018.01) |
| *H04W 4/024* | (2018.01) |
| *H04W 4/40* | (2018.01) |
| *G01C 21/36* | (2006.01) |

(52) U.S. Cl.
CPC .. *G06F 16/24575* (2019.01); *G06F 16/24578* (2019.01); *G06F 16/9535* (2019.01); *G06F 16/9537* (2019.01); *H04L 67/12* (2013.01); *H04L 67/18* (2013.01); *H04L 67/22* (2013.01); *H04L 67/306* (2013.01); *H04W 4/021* (2013.01); *H04W 4/024* (2018.02); *H04W 4/40* (2018.02); *B60W 2040/0872* (2013.01)

(58) Field of Classification Search
CPC ........... B60W 40/08; B60W 2040/0872; G06F 17/30528; G06F 17/3053; G06F 17/30867; G06F 17/3087
See application file for complete search history.

(56) References Cited

U.S. PATENT DOCUMENTS

| | | | |
|---|---|---|---|
| 5,276,451 | A | 1/1994 | Odagawa |
| 5,610,822 | A | 3/1997 | Murphy |
| 6,507,838 | B1 | 1/2003 | Syeda-Mahmood |
| 6,898,517 | B1 | 5/2005 | Froeberg |
| 7,472,075 | B2 | 12/2008 | Odinak et al. |
| 7,512,487 | B1 | 3/2009 | Golding et al. |
| 8,285,726 | B2 | 10/2012 | Billmaier et al. |
| 9,251,745 | B2 * | 2/2016 | Sprague ................ G02B 27/286 |
| 2001/0008404 | A1 | 7/2001 | Naito et al. |
| 2003/0014275 | A1 | 1/2003 | Bearden, III et al. |
| 2004/0054444 | A1 | 3/2004 | Abeska et al. |
| 2009/0316671 | A1* | 12/2009 | Rolf ...................... H04W 4/029 370/338 |
| 2011/0055133 | A1* | 3/2011 | Gee ...................... A61B 5/0015 706/46 |
| 2012/0089945 | A1 | 4/2012 | Bellamy et al. |
| 2012/0259706 | A1 | 10/2012 | Lobaza et al. |
| 2013/0073389 | A1 | 3/2013 | Heath |
| 2013/0124539 | A1 | 5/2013 | Lin et al. |
| 2013/0215241 | A1* | 8/2013 | Onishi ................. H04N 13/398 348/51 |
| 2013/0278828 | A1* | 10/2013 | Todd ................ H04N 21/25875 348/564 |
| 2013/0311898 | A1* | 11/2013 | Beaurepaire ....... G01C 21/3688 715/744 |
| 2014/0195143 | A1 | 7/2014 | Kandangath et al. |
| 2014/0201770 | A1* | 7/2014 | Schraga ............... G11B 27/036 725/14 |
| 2015/0318020 | A1* | 11/2015 | Pribula ................ H04N 9/8205 386/227 |
| 2016/0347391 | A1* | 12/2016 | Krispin .................. A41D 1/002 |
| 2017/0076407 | A1* | 3/2017 | Thomas ................. G06Q 50/12 |
| 2018/0164108 | A1* | 6/2018 | Rahal-Arabi ...... G01C 21/3484 |

OTHER PUBLICATIONS

Wang, Jing-Shiarn et al., "The Role of Driver Inattention in Crashes; New Statistics from the 1995 Crashworthiness Data System," Nov. 11, 2006, 20 pages.

Latham, Caroline, "Why do You Turn Down the Radio When You're Lost?" Sharpbrains, Nov. 11, 2006, 4 pages. Available <https://sharpbrains.com/blog/2006/11/11/why-do-you-turn-down-the-radio-when-youre-lost/>.

United States Patent and Trademark Office, "Non-Final Office Action," dated Sep. 27, 2018 in connection with U.S. Appl No. 15/380,950, 19 pages.

United States Patent and Trademark Office, "Final Office Action," dated Sep. Jan. 30, 2019 in connection with U.S. Appl. No. 15/380,950, 10 pages.

United States Patent and Trademark Office, "Notice of Allowance," dated Sep. Apr. 15, 2019 in connection with U.S. Appl. No. 15/380,950, 5 pages.

* cited by examiner

DYNAMIC CONTENT DELIVERY BASED ON VEHICLE NAVIGATIONAL ATTRIBUTES

RELATED APPLICATION

This patent arises from a continuation of U.S. patent application Ser. No. 15/380,950, (Now U.S. Pat. No. 10,393,530), which was filed on Dec. 15, 2016. U.S. patent application Ser. No. 15/380,950 is hereby incorporated herein by reference in its entirety. Priority to U.S. patent application Ser. No. 15/380,950 is hereby claimed.

TECHNICAL FIELD

The present disclosure relates generally to a mechanism for dynamically generating media content and presenting the media content in a vehicle, and more specifically the present disclosure relates to systems and methods for dynamically generating and presenting sporting event data based on vehicle navigational attributes.

BACKGROUND

Vehicle computing systems are getting more and more advanced. In addition, content delivered to a vehicle no longer simply includes basic radio content. Many vehicles may be able to receive much more sophisticated and targeted content. There may be limited space on a vehicle's integrated display device to display data to a user in the vehicle, and safety and other considerations may need to be considered when a vehicle is in motion.

BRIEF DESCRIPTION OF THE DRAWINGS

The present disclosure is illustrated by way of example and not limitation in the figures of the accompanying drawings, in which like reference numbers indicate similar elements.

DETAILED DESCRIPTION

Systems and methods described herein relate to dynamically generating media content and presenting the media content in a vehicle. In one example, a user may wish to receive content related to a live sporting event. The user may interact with a display or other controls (e.g., voice command, touch screen, dials, etc.) in the vehicle to specify the sporting event for which the user wishes to receive content. The computing device in the vehicle may generate and present the sporting event content to the user based on navigational attributes or conditions of the vehicle. For example, if the user is on a long trip down a straight highway with few turns and little need for detailed navigational instructions, the computing device in the vehicle may adjust the sporting event content presented to the user by including further detail or more exciting data. In another example, a user may be driving in a city with a lot of traffic and need to make many turns. In this example, the computing device in the vehicle may present only high-level sporting event content (e.g., a score of a game) or even freeze or turn off the display of data so that the user does not get unnecessarily distracted. In yet another example, a user may suddenly brake, turn, or accelerate. In this example, the computing device in the vehicle may pause or turn off the display of data until the user resumes regular driving.

For example, a computing device in a vehicle may receive data from a server computer. The data may comprise a plurality of sporting event data items. The computing device may determine which of the plurality of sporting event data items to present to a user, by performing various operations. Some example operations may comprise determining a relevancy score for each sporting event data of the plurality of sporting event data, and analyzing navigational attributes of the vehicle to determine navigational conditions. The computing device may select sporting event data items based on the relevancy score and navigational conditions, and may present the selected sporting event data items to the user.

Figure 1:
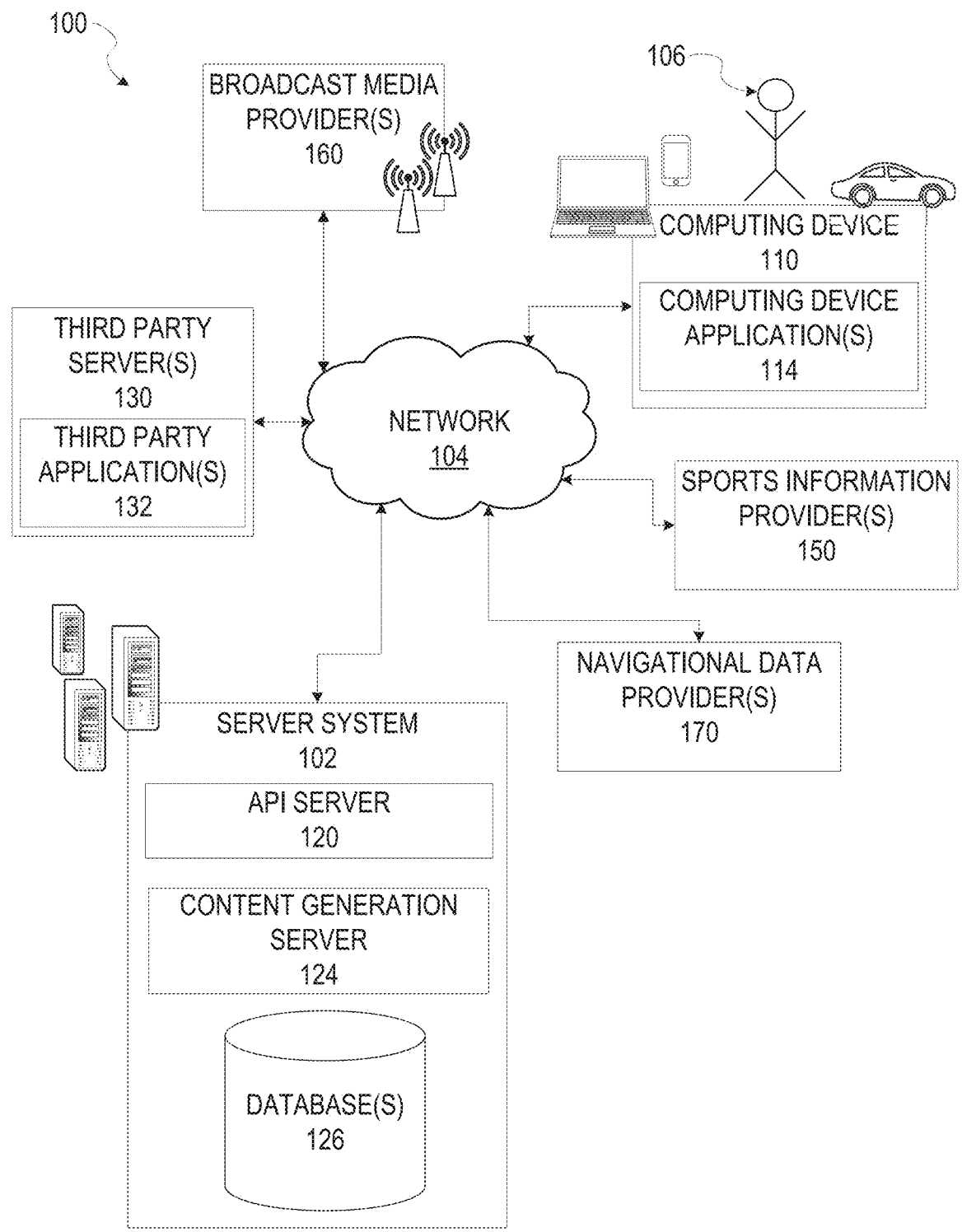
FIG. 1 is a block diagram illustrating a networked system, according to some example embodiments, to generate and deliver content to a vehicle.

FIG. 1 is a block diagram illustrating a networked system 100, according to some example embodiments, configured to generate and present content in a vehicle. The networked system 100 may include one or more computing devices such as a computing device 110. The computing device 110 may comprise, but is not limited to, a mobile phone, desktop computer, laptop, portable digital assistant (PDA), smart phone, tablet, ultra book, netbook, multi-processor system, microprocessor-based or programmable consumer electronics, game console, set-top box, or computer in a vehicle, or any other communication device that a user may utilize to access the networked system 100. In some embodiments, the computing device 110 may comprise a display module (not shown) to display information (e.g., in the form of user interfaces). In further embodiments, the computing device 110 may comprise one or more of touch screens, accelerometers, gyroscopes, cameras, microphones, global positioning system (GPS) devices, and so forth.

The computing device 110 may be a device of a user 106 that is used to search and display location information, maps, and content station information (e.g., music stations, TV stations, etc.). The computing device 110 may further be used to view and/or listen to content of content stations (e.g., music, sports, talk shows, etc.), and so forth. In one example embodiment, the computing device 110 may be a computer in a vehicle that can be used to provide the user 106 with location information, maps, navigation information, content station information (e.g., music stations, TV stations, etc.), and so forth.

Figure 2:
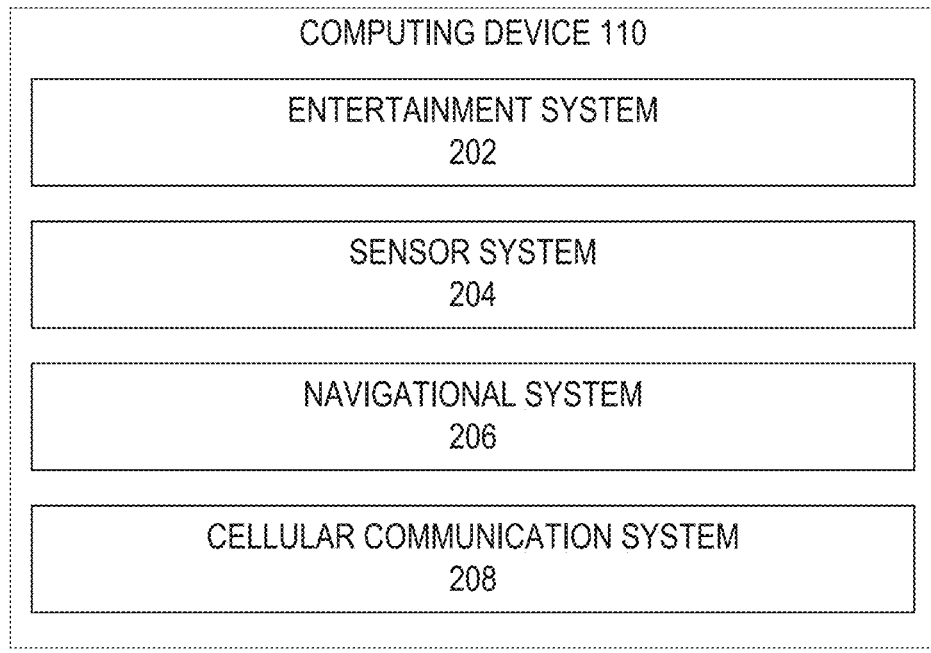
FIG. 2 is a block diagram illustrating an example computing device in a vehicle, according to some example embodiments.

FIG. 2 shows example components that may be further included in a computing device 110 in a vehicle. The example in FIG. 2 is shown as one computing device 110 for illustration purposes. A vehicle may contain various computing devices, which may also be referred to as electronic control units (ECUs) or microprocessors. For example, a vehicle may comprise one or more ECUs for controlling the engine or transmission, airbags, anti-lock braking system (ABS), cruise control, electric power steering, power windows, battery, recharging system for hybrid/electric cars, and audio systems, as well as unlocking doors, adjusting mirrors, and so forth. The ECUs may access sensors to detect variables such as temperature (e.g., air temperature, engine temperature, etc.), pressure, voltage, air pressure, throttle position, oxygen, knock, acceleration at different angles, braking, yaw and roll of the vehicle, steering angle, and many other variables. Data from the sensors and ECUs in the vehicle may be communicated via a communication system such as a communications bus (e.g., CANbus network). For example, each ECU may transmit all of its sensor and programming information constantly to the network and each ECU may also "listen" to the network to access the information it may need to carry out its work.

In one example, the computing device 110 in the vehicle may include an entertainment system 202. The entertainment system 202 may include an AM/FM radio, a compact disc player, an equalizer/amplifier, speakers, one or more display screens, controls for the entertainment system 202, and so forth. The entertainment system 202 may further include one or more computing device applications 114 (FIG. 1) for providing content (e.g., satellite radio options, sporting event data, news programming, media playlists, etc.) to the user 106 of the vehicle.

The computing device 110 in the vehicle may further include a sensor system 204. The vehicle may have a number of sensors throughout the vehicle related to security, vehicle performance and diagnostics, and so forth, as explained above. For example, the vehicle may have sensors to detect wheel speed, engine oil pressure, coolant level and pressure, transmission status, breach in security, crankshaft position, fuel level, engine temperature, oxygen level in exhaust gasses, engine speed, pre-ignition knock, obstruction when closing windows or doors, and so forth. The vehicle may have sensors in the driver seat and passenger seats to detect the number of passengers, movement of the driver and each passenger, temperatures and heart rates of the driver and passengers, and so forth.

The computing device 110 in the vehicle may further include a navigational system 206. The navigational system 206 may include one or more location detection systems to determine the geolocation of the vehicle. One example of a location detection system is a GPS device. A GPS device may include a receiver that has an antenna to receive signals from a satellite network. The navigational system 206 may use the satellite positioning signals to compute coordinates that identify the location of the vehicle (e.g., longitude, latitude, altitude). The navigational system 206 may include one or more computing device applications 114 (FIG. 1) for showing the location of the vehicle on a map, providing navigational instructions (e.g., driving directions, notifications of change in route due to change in traffic conditions, etc.), and so forth.

The computing device 110 in the vehicle may further include a cellular communication system 208. The cellular communication system 208 may allow the user 106 to place and receive phone calls from the vehicle. The cellular communication system 208 may include voice control functionality to allow the user 106 to place and receive calls by voice command while driving or in the vehicle. Accordingly, the cellular communication system 208 may include one or more microphones to detect the voice commands from the user 106.

Referring again to FIG. 1, the one or more users 106 may be a person, a machine, or other means of interacting with the computing device 110. In one example embodiment, the user 106 may be a driver or a passenger in a vehicle.

In example embodiments, the user 106 may not be part of the networked system 100, but may interact with the networked system 100 via the computing device 110 or other means. For instance, the user 106 may provide input (e.g., touch screen input or alphanumeric input) to the computing device 110 and the input may be communicated to other entities in the networked system 100 (e.g., third-party servers 130, server system 102, etc.) via a network 104. In this instance, the other entities in the networked system 100, in response to receiving the input from the user 106, may communicate information to the computing device 110 via the network 104 to be presented to the user 106. In this way, the user 106 may interact with the various entities in the networked system 100 using the computing device 110.

The networked system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, an over-the-air network, a radio network, another type of network, or a combination of two or more such networks.

The computing device 110 may access the various data and applications provided by other entities in the networked system 100 via one or more computing device applications 114. The computing device 110 may include one or more computing device applications 114 (also referred to as "apps") such as, but not limited to, a web browser, a messaging application, an electronic mail (email) application, an e-commerce site application, a mapping or location application, a content station application, a sports update application, and the like. In some embodiments, one or more computing device applications 114 may be included in a given one of the computing devices 110 and may be configured to locally provide the user interface and at least some of the functionalities of the one or more computing device applications 114. The computing device application 114 may be configured to communicate with other entities in the networked system 100 (e.g., third-party servers 130, server system 102, etc.), on an as-needed basis, for data and/or processing capabilities not locally available (e.g., to access sporting event data, to authenticate the user 106, to verify a method of payment, etc.). Conversely, one or more computing device applications 114 may not be included in the computing device 110, and then the computing device 110 may use its web browser to access the one or more applications hosted on other entities in the networked system 100 (e.g., third-party servers 130, server system 102, etc.).

A server system 102 may provide server-side functionality via the network 104 (e.g., the Internet or a wide area network (WAN)) to one or more third party servers 130 and/or the one or more computing devices 110. The server system 102 may include an application programming interface (API) server 120 and a content generation server 124 that may be communicatively coupled with one or more databases 126. The databases 126 may be storage devices that store information such as sports data, user profile data, sporting event data, data related to a particular vehicle or type of vehicle, broadcast schedules, broadcast data, and so forth.

The content generation server 124 may provide functionality to generate sporting event data related to at least one sporting event (e.g., game, sports team, sports league, sports player, major sports incident, etc.), provide the sporting event data to a third party server 130 or computing device 110, and receive requests for sporting event data, among other things. The content generation server 124 may access the one or more databases 126 to retrieve stored data to use in generating sporting event data and to store generated sporting event data and data associated with generated sporting event data. For example, the content generation server 124 may store a timestamp for generated sporting event data; content of sporting event data; user identifier(s) related to sporting event data; teams, leagues, players, and sporting event(s) related to sporting event data; relevancy scores for sporting event data; and so forth. This data may be associated with a user profile. This data can in turn be used to generate future sporting event data.

The networked system 100 may further include one or more third party servers 130. The one or more third-party servers 130 may include one or more third-party application(s) 132. The one or more third-party application(s) 132, executing on the third-party server(s) 130, may interact with the server system 102 via a programmatic interface provided by the API server 120. For example, one or more of the third-party applications 132 may request and utilize information from the server system 102 via the API server 120 to support one or more features or functions on a website hosted by a third party or an application hosted by the third party. The third-party website or application 132, for example, may provide sporting event functionality, content station-related information, map or location information, or other information or functionality that is supported by relevant functionality and data in the server system 102.

The networked system 100 may further include one or more broadcast media providers 160. The broadcast media providers 160 include providers for radio broadcasting, television broadcasting, etc. Broadcast media providers may also refer to broadcast stations (e.g., content stations such as broadcast radio stations). For example, radio broadcasting may be done over radio waves. Radio stations may be linked in radio networks to broadcast a common radio format (e.g., broadcast syndication, simulcast, or both). Audio broadcasting may be done via cable radio, local wire television networks, satellite radio, internet radio via streaming media on the Internet, etc. In one example embodiment, radio (or other) broadcasting is received by the computing device 110 in a vehicle. In another example embodiment, the server system 102 may receive radio (or other) broadcasts and analyze the broadcast data to determine what type of content is being broadcast, what content station is broadcasting the content, information describing the content, and so forth. In one example, the server system 102 may analyze broadcast data to determine a sporting event being broadcast.

The networked system 100 may further include one or more sports information provider(s) 150. The sports information providers 150 may include sources that store detailed sports data, analysis of sports data, factoids related to sports data, user data related to sports (e.g., fantasy league data), and so forth. The server system 102 may, in addition or alternatively, generate and store sports information independently of any sports information provider(s) 150.

The networked system 100 may further include one or more navigational data provider(s) 170. The navigational data providers 170 may include sources that generate and store navigational data such as geolocation data, traffic information, road and construction data, and so forth.

The user 106 may wish to receive content related to a live sporting event, prior sporting event, news event, entertainment event, and so forth. The user 106 may interact with a display or other controls (e.g., voice command, touch screen, dials, etc.) in the vehicle to specify the sporting event, for example, for which the user 106 wishes to receive content. The computing device 110 in the vehicle may receive the indication that the user 106 wishes to receive content for the sporting event and request data from a server computer (e.g., server system 102 via the API server 120) related to the sporting event. The server computer may generate the data related to the sporting event and send it to the computing device 110. For example, the content generation server 124 may access data stored in the one or more databases 126, data from the one or more sports information providers 150, or data from the one or more broadcast media providers 160 to generate data related to the sporting event. The data may comprise a plurality of sporting event data items. For example, the sporting event data items may be game scores, game plays, game highlights, game player data, statistics related to the sporting event, factoids related to the sporting event, and so forth. In addition, the data may include supplemental data related to a particular sporting event. For example, the data may include data for related games, competitor teams, outcomes of playoffs or other events that affect the particular sporting event, major sporting news and records, and so forth.

Each sporting event data item may be associated with a relevancy score. The relevancy score may be computed based on various factors, such as a level of detail of the sporting event data item, the user's relationship to the sporting event, user profile information, the user's relationship to the team or players of the sporting event, the geolocation of the vehicle, and so forth. The server system 102 or computing device 110 may use one or more of these factors to compute the relevancy score for a sporting event data item.

In one example, the server system 102 may compute the relevancy score in advance and store the relevancy score associated with the sporting event data item in the one or more databases 126. In another example, the server system 102 may compute the relevancy score once it receives a request for data. For instance, the request may include information identifying a user and/or a geolocation of the vehicle. The server system 102 may access user profile information to compute the relevancy score based on such information to send to the computing device 110 with the data. The server system 102 may utilize geolocation information to compute the relevancy score. In another example, the server system 102 may recalculate a stored relevancy score based on data specific to the user, geolocation, or other scenario-specific data.

For example, sports information or data can be stored according to different predetermined levels of data or detail (e.g., from major events to more detailed events within the sporting event(s)). A relevancy score for sporting event data may be higher if the sporting event data item contains higher-level details, since many users may be more interested in the higher-level details, such as game scores and major plays, versus lower-level details, such as substitutions or injuries (depending on the sporting event).

In one example, goals/scores may be a first level (e.g., a highest level), major/key plays (e.g., interceptions, turnovers, etc.) may be a second level, milestones throughout the game (e.g., kickoffs, fouls, etc.) may be a third level, player data (e.g., substitutions, injuries, records) may be a fourth level, and so forth. In another example, the first level may be data at a sports type (e.g., football, soccer) or season level, the second level may be a league level, the third level may be a player level, and so forth. In another example, the first level may be the final scorecard or final standing (e.g., cricket, track & field 100 m, gymnastics, swimming, etc.), the second level may be the semi-final scores, the third level may be qualifying rounds, etc. Additionally, for a user interested in just the statistics or records, the first level may be the world record information, the second level may be game level (e.g., Olympics, Asian Games), the third level may be country (e.g., USA, China, Japan) best, and the fourth level may be personal record best.

Other levels of data may include team, venue (e.g., region, city, stadium, etc.), special achievements (e.g., record-breaking events such as the longest series of wins, highest score per hour, longest pass, fastest sprint, etc.), game/event duration, and so forth. For example, the first level may be a sport type, the second level may be a venue (e.g., to present information all about games that happened in a particular region), and the third level may be a team level (e.g., which teams played there when). In another example, the first level may be special achievements (e.g., highest-scoring game), the second level may be a sport discipline (e.g., soccer), and the third level may be a time frame (e.g., last year).

In one example embodiment, factoids based on the data related to sporting events may be generated by the server system 102. For example, a fact about a player who scored a goal, the teams playing, etc. may be generated. In another example, analysis of the data may be conducted by the server system 102 to generate various statistics and predictions based on the data (e.g., analysis of player statistics, probability of winning a game or medal, probability of going to the playoffs, etc.). The data comprising a plurality of sporting event data items that is provided to the computing device 110 in a vehicle may also include factoids and analysis to be presented to the user 106, as described in further detail below.

In another example, user profile information may be used to determine the relevancy score. For example, user profile information may indicate sports of interest, teams of interest, players of interest, types of information interesting to a user, and so forth. This information may be used to determine the relevance of the sporting event data item to a user.

In another example, geolocation of the vehicle may be used to calculate the relevancy score. For example, geolocation may indicate sports of interest, teams of interest, and so forth.

The server system 102 may send the data comprising a plurality of sporting event data items to the computing device 110. The data may comprise data associated with the live sporting event. Optionally, the data may comprise data associated with other sporting events related to the live sporting event (e.g., related teams, competitors, player statistics, player records, team statistics, team records, and other factoids and analysis). The data may comprise a relevancy score for each sporting event data item, as explained above.

Figure 3:
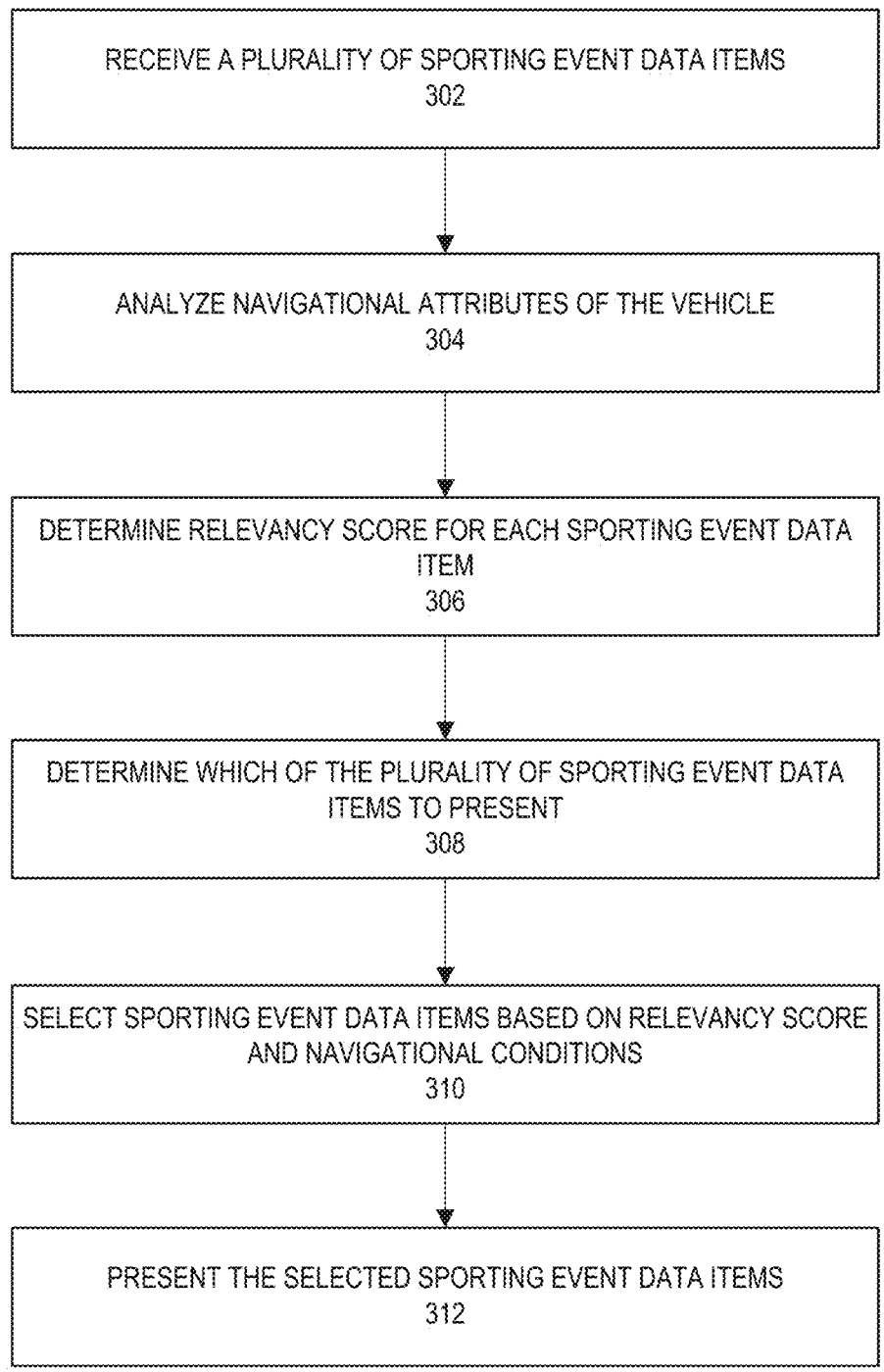
FIG. 3 is a flowchart illustrating aspects of a method, according to some example embodiments, for determining which data to present in a vehicle.

FIG. 3 is a flow chart illustrating aspects of a method 300, according to some example embodiments, for determining which data to present in a vehicle. For illustrative purposes, the method 300 is described with respect to the networked system 100 of FIG. 1. It is to be understood that the method 300 may be practiced with other system configurations in other embodiments.

In operation 302, the computing device 110 in the vehicle receives data comprising a plurality of sporting event data items from a server computer (e.g., the API server 120). The data optionally comprises a relevancy score for each sporting event data item. The computing device 110 may store the data in local storage.

In operation 304, the computing device 110 may analyze navigational attributes of the vehicle to determine navigational conditions. For example, the computing device 110 may access sensor data in the vehicle and analyze the vehicle sensor data to determine navigational conditions. In one example, the computing device 110 may access (e.g., directly and/or via an API) a communication system in the vehicle (e.g., CANbus) to detect sensor information relevant to navigational conditions. For example, the computing device 110 may analyze sensor data related to wheel speed, engine speed, steering, brakes, weather conditions, and so forth, to determine vehicle speed, acceleration/deceleration, terrain, weather, turns, and so forth. The computing device 110 may determine, based on the analysis of the sensor data in the vehicle, that the navigational conditions are high maintenance, neutral, or low maintenance.

The computing device 110 may also access navigational data via the vehicle navigational system, navigational data providers 170, or other means, and analyze navigational attributes such as traffic, road conditions, weather, missed turns, and so forth. The computing device 110 may determine, based on the analysis of the navigational data, that the navigational conditions are high maintenance, neutral, or low maintenance.

In operation 306, the computing device 110 may determine a relevancy score for each sporting event data item. If the data received from the server computer comprises a relevancy score for each sporting event data item, the computing device 110 may determine the relevancy score for each sporting event data item by analyzing the data from the server computer to determine the relevancy score. If the data received from the server computer does not comprise a relevancy score for each sporting event data item, the computing device 110 may calculate the relevancy score. In another example, the computing device 110 may calculate the relevancy score using the relevancy score received from the server computer, and other details as described herein.

As explained above, a relevancy score may be computed based on a level of detail of the sporting event data item, the user's relationship to the sporting event, user profile information, the user's relationship to the team or players of the sporting event, the geolocation of the vehicle, and so forth. For example, the relevancy score may comprise a numerical value in a predetermined range (e.g., 0-100); a value such as high, medium, or low; or another value for indicating how relevant the sporting event data item is to the sporting event and/or user. As explained above, the relevancy score may be computed by the server system 102 in advance or at the time that the request is received from the computing device 110. Alternatively, the relevancy score may be computed by the computing device 110 based on the level of detail received from the server system 102 and a user profile, the geolocation of the vehicle, or other information accessible by the computing device 110.

The computing device 110 may use the relevancy score to determine which of the plurality of sporting event data items to present to the user in the vehicle based on navigational attributes, as shown in operation 308. For example, if the navigational attributes indicate that the user is on a long trip down a straight highway with few turns and little need for detailed navigational instructions, the computing device 110 in the vehicle may adjust the sporting event content presented to the user by including further detail or more exciting data. Thus, the computing device 110 may choose sporting event data items with high, medium, and low relevancy scores since the conditions allow for more detail. In another example, a user may be driving in a city with a lot of traffic and need to make many turns. In this example, the computing device 110 in the vehicle may present only high-level sporting event content (e.g., a score of a game) or even freeze or turn off the display so that the user does not get unnecessarily distracted. Thus, the computing device 110 may select only sporting event data items with a high relevancy score.

The computing device 110 may select sporting event data items based on the relevancy score of the sporting event data items and navigational conditions, as shown in operation 310. For example, if the computing device 110 determines that the navigational conditions are high maintenance, the computing device 110 may select only the sporting event data items with a high relevancy score. For example, the computing device 110 may determine that a turn density over time is high, indicating a high-maintenance driving condition. In another example, the computing device 110 may determine that the user has missed a lot of turns, indicating a high-maintenance driving condition. In yet another example, the computing device 110 may determine that there is a sudden acceleration or deceleration of the vehicle, a sudden turn of the steering wheel, complex navigational instructions, changing or adverse traffic conditions, changing or adverse weather conditions, and so forth, indicating a high-maintenance driving condition.

In another example, if the computing device 110 determines that the navigational conditions are low maintenance or neutral, the computing device 110 may provide more details to the user by selecting more sporting event data items with medium and low relevancy scores in additional to sporting event data items with high relevancy scores. For example, the computing device 110 may determine that traffic is moving slowly and will be moving slowly for some time.

In operation 312, the computing device 110 presents the selected individual sporting event data to the user. The computing device 110 may present the selected sporting event data item on one or more displays in the vehicle, by providing an audio version of the sporting event data item via one or more speakers in the vehicle, and so forth. The computing device 110 may use a combination of presentation methods.

In addition, or in the alternative, the computing device 110 may use other methods of determining which of the plurality of sporting event items to present and for selecting sporting event data items. For example, the computing device 110 may determine a user emotional state of the user operating the vehicle (or of a passenger in the vehicle). For example, the computing device 110 may analyze eye tracking data, user heart rate, sensor data in the user seat, and so forth, to determine that the user emotional state is calm, neutral, or agitated/distracted. If the computing device 110 determines that the emotional state of the user is agitated, the computing device 110 may select only the sporting event data items with a high relevancy score. If the computing device 110 determines that the user emotional state is calm or neutral, the computing device 110 may provide more details to the user by selecting more sporting event data items with medium and low relevancy scores in additional to sporting event data items with high relevancy scores.

In one example, the computing device 110 analyzes eye tracking data to determine a user emotional state. The computing device 110 in the vehicle may comprise or have access to an eye tracking technology system in the vehicle. Eye tracking technology may use cameras, projectors, infrared lights, and sensors to capture images and extract relevant information from the images. The eye tracking technology system may calculate a user head position and where the user's eyes are looking. The eye tracking technology system may analyze gaze direction and eyelid movement to determine a level of user fatigue and distraction.

In another example, the computing device 110 may access heart rate data from wearable devices that monitor a user's heart rate (e.g., Apple Watch, UP3, etc.), from sensors located in or near a user's seat, and so forth. For example, a seat may include one or more sensors for detecting electrical pulses from the user's heart. The computing device 110 may analyze the heart rate data to determine the user's emotional state. For example, the computing device 110 may determine that the user's heart rate has quickly increased, indicating agitation. In another example, the computing device 110 may determine that the user's heart rate is at a resting rate, indicating that the user is calm.

The computing device 110 may also access data from other biometric sensors that detect breathing rate, skin conditions (e.g., sweaty or dry skin), brain waves, muscle activity, and so forth. The computing device 110 may analyze this data to determine whether the user is calm, neutral, or agitated. For example, the computing device 110 may determine that a user is agitated because the user is breathing more rapidly, is holding his or her breath, has sweaty skin, and so forth. In another example, the computing device 110 may determine that a user is calm because the user is breathing steadily or slowly, and has dry skin. In yet another example, the computing device 110 may determine that a user is agitated by analyzing brain wave data that indicates stress. And in another example, the computing device 110 may determine that a user is agitated or distracted by analyzing muscle activity that indicates restlessness (e.g., frequent movement in the seat). The computing device 110 may use one or more of these methods to determine a user's overall emotional state and use the emotional state to select sporting event data items. For example, if the computing device 110 determines that the user emotional state is agitated, the computing device 110 may select only the sporting event data items with a high relevancy score.

The computing device 110 may use a variety of data (e.g., navigational attributes, sensor data, etc.) and analysis to select sporting event data items, either alone or in some combination of the data and analysis.

Figure 4:
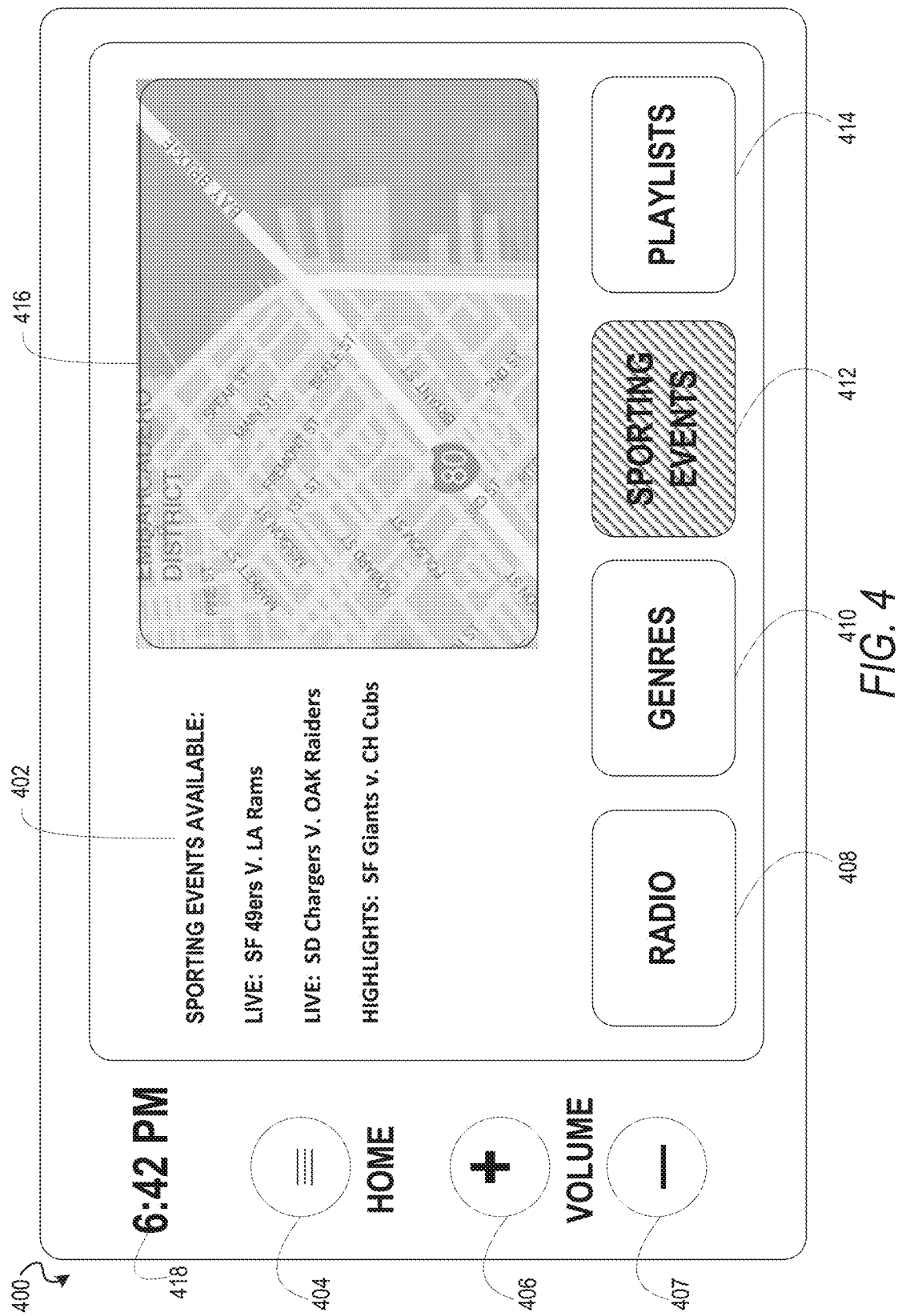
FIGS. 4-5 illustrate example interfaces, according to some example embodiments.

FIG. 4 shows an example interface that may be used to display selected sporting event data items to a user in a vehicle. A display 400 may include a current time 418, date, and/or other data. The display 400 may include a display area 402 including an indication of what content is currently available to view or listen to in the vehicle. In this example, the user may access content for two live football games and highlights for a baseball game.

The display 400 may have a number of menu items 404-414. For example, the display 400 may have a home menu item 404, a volume increase menu item 406, and a volume decrease menu item 407. The display 400 may have a radio menu item 408 for a user to choose to tune in to the radio. The display 400 may have a genres menu item 410 to select different genres of content to listen to, and a playlists menu item 414 to listen to either predetermined or user-prepared playlists. The display 400 may have a sporting events menu item 412 that a user may select to get sporting event data. In this example, the display 400 indicates that the sporting events menu item 412 is selected (and thus, the sporting events available are shown in the display area 402). There may be an area 416 within the display 400 that can display various data such as navigational information (such as the map shown), cover art related to an artist or album playing, or sporting event data.

Figure 5:
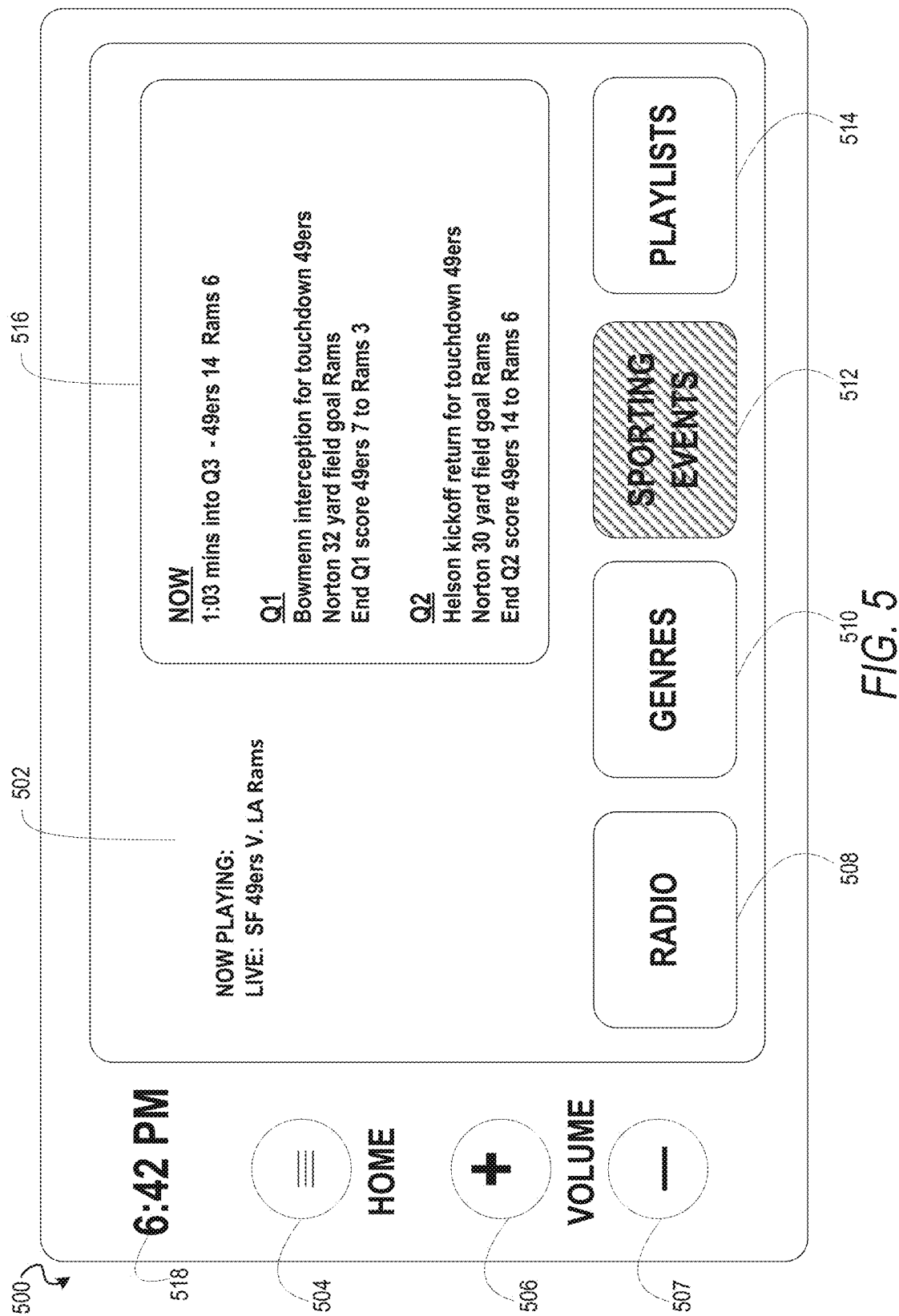

The user may select a particular sporting event (e.g., from a list in the display area 402) to receive content related to the event. For example, a user may select the live 49ers game. FIG. 5 illustrates a display 500 with an area 502 to indicate what content is being provided and a display of the content in an area 516.

In some example embodiments, there may be multiple fields for display of sporting event data and/or multiple display screens. For example, there may be one display screen in an instrument panel in front of a user and another display panel to the side of the user. In one example, the most important or most relevant data may be displayed at all times, while other data may change or be updated regularly. For instance, the name of the sporting event and the score may be displayed at all times while the other data (e.g., plays, goals, statistics, etc.) may be displayed, changed, frozen, or removed, based on various conditions as described above.

Figure 6:
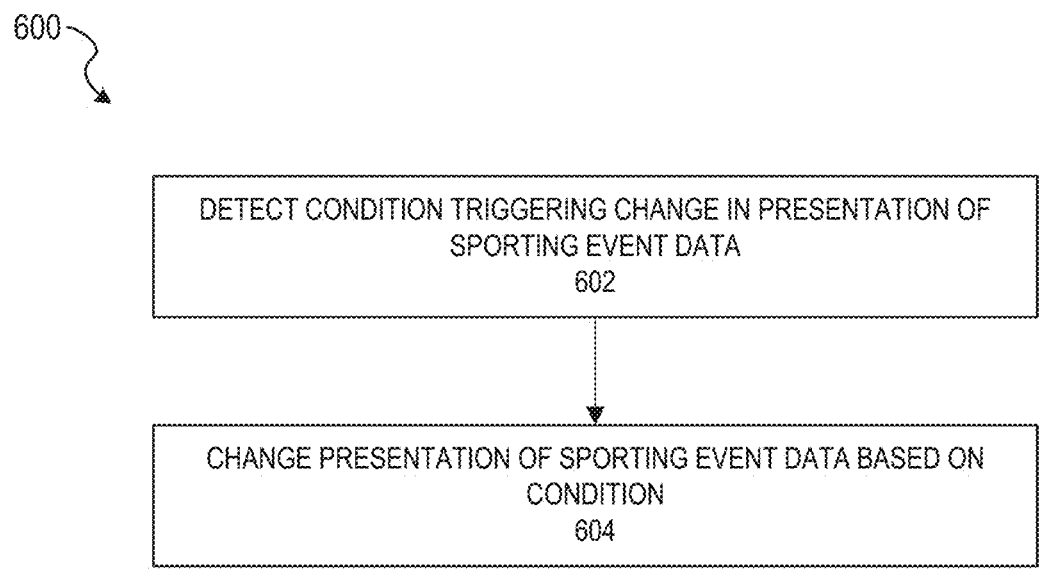
FIG. 6 is a flowchart illustrating aspects of a method, according to some example embodiments, for detecting a condition that may trigger a change in the presentation of data to a user.

FIG. 6 is a flow chart illustrating aspects of a method 600, according to some example embodiments, for detecting a condition that may trigger a change in the presentation of sporting event data to a user. For illustrative purposes, the method 600 is described with respect to the networked system 100 of FIG. 1. It is to be understood that the method 600 may be practiced with other system configurations in other embodiments.

In operation 602, the computing device 110 may detect a condition triggering a change in presentation of sporting event data. Some examples of such conditions may include a sudden acceleration or deceleration of the vehicle, a sudden turn of the steering wheel, complex navigational instructions, changing traffic conditions, changing weather conditions, a navigational announcement, an incoming or outgoing phone call, changing navigational conditions (e.g., from high to low and vice versa), changing user emotional state (e.g., from calm to agitated and vice versa) and so forth. As explained above, the computing device 110 may be constantly monitoring various sensors and other data in the vehicle. The computing device 110 may store a predetermined list of conditions which trigger a change in presentation of sporting event data and the associated change in presentation for each of the conditions.

In operation 604, the computing device 110 changes the presentation of the sporting event data based on the condition detected. For example, the computing device 110 may detect a sudden acceleration of the vehicle and/or sharp turn of the steering wheel. In response, the computing device 110 may pause the presentation of data so that it does not distract the user (e.g., the driver). The computing device 110 may detect when the condition ends (e.g., the vehicle returns to a normal driving pattern) and resume the presentation of data. The computing device 110 may resume the presentation from where it left off, or may skip ahead to a different portion of the data (e.g., in the case of a live sporting event). For example, the computing device 110 may skip ahead when there is less relevant data to catch up to the live game being broadcast.

In another example, the computing device 110 may change the font of the display (e.g., to a larger font) and/or freeze the display of the data.

In some example embodiments described above, the computing device 110 in a vehicle is receiving data and determining which data to present in the vehicle. In another example, the server system 102 (e.g., via the content generation server 124) may perform these operations. For example, the content generation server 124 may analyze navigational data to determine content for the sporting event data. The content generation server 124 may analyze navigational data received from the computing device 110 in the vehicle to determine the geolocation of the vehicle, driving conditions, etc. This data may also be determined from sensor data (e.g., tire sensors, steering sensors, etc.) to determine driving conditions, etc. For example, based on navigational data and/or sensor data, the server system 102 may determine whether the user is on a long trip, whether the user is on a straight stretch of the road, whether the user is making a lot of turns, etc. Navigational data may also be helpful to determine whether to provide longer sporting event information, to provide shorter sporting event information, to delay the sporting event information until the user is in safer driving conditions (e.g., not in a blizzard or in a busy city making frequent turns), and so forth. The server system 102 may determine which content to send to the computing device 110 to display in the vehicle.

Examples are described herein related to sporting event data for illustrative purposes, but are not limited to such a scenario. Example embodiments may include other media content. Likewise, examples are described herein related to a computing device in a vehicle for illustrative purposes, but are not limited to such a scenario. For example, sporting event data (or other data) may be generated and provided to computing devices in other scenarios (e.g., a mobile device, a computing device in an airplane, a tablet computer, etc.).

Figure 7:
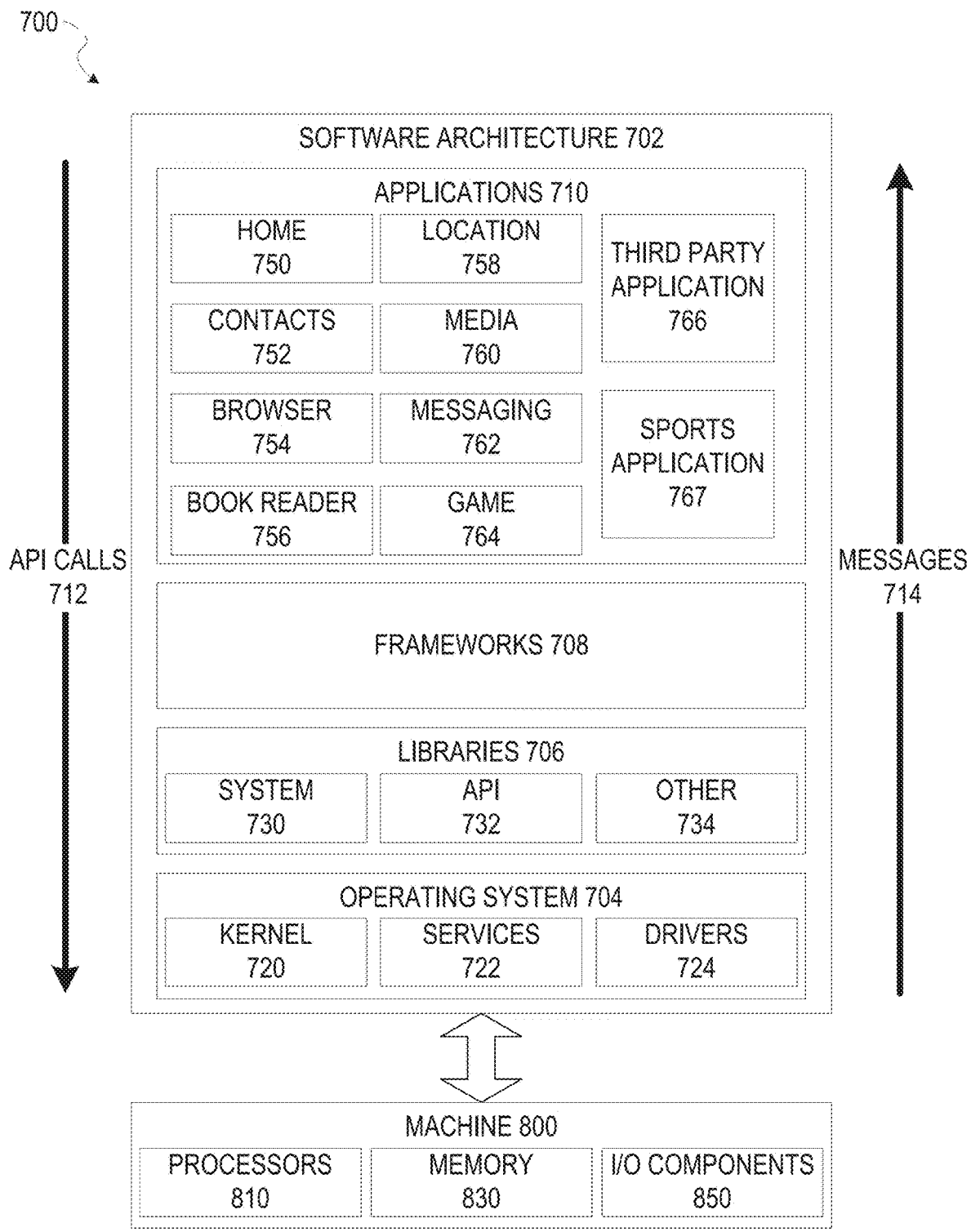
FIG. 7 is a block diagram illustrating an example of a software architecture that may be installed on a machine, according to some example embodiments.

FIG. 7 is a block diagram 700 illustrating a software architecture 702, which can be installed on any one or more of the devices described above. For example, in various embodiments, the computing devices 110, third party server 130, server system 102, API server 120, and content generation server 124 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and I/O components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and three dimensions (3D) on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a sports application 767. In certain embodiments, this may be a standalone application that operates to manage communications with a server system such as the third party servers 130 or the server system 102. In other embodiments, this functionality may be integrated with another application such as a location application, a content station application, or another such application. The sports application 767 may request and display various types of sports information (e.g., sporting event data, listing of sporting events, sporting events available to tune in to, etc.) and may provide the capability for a user to input data related to sports or one or more sporting events via a touch interface, keyboard, or camera device of the machine 800; communication with a server system via the I/O components 850; and receipt and storage of sports data, user data, etc. in the memory 830. Presentation of sporting event data or sports update information, and user inputs associated with sports information and sporting event data, may be managed by the sports application 767 using different frameworks 708, library 706 elements, or operating system 704 elements operating on the machine 800.

Figure 8:
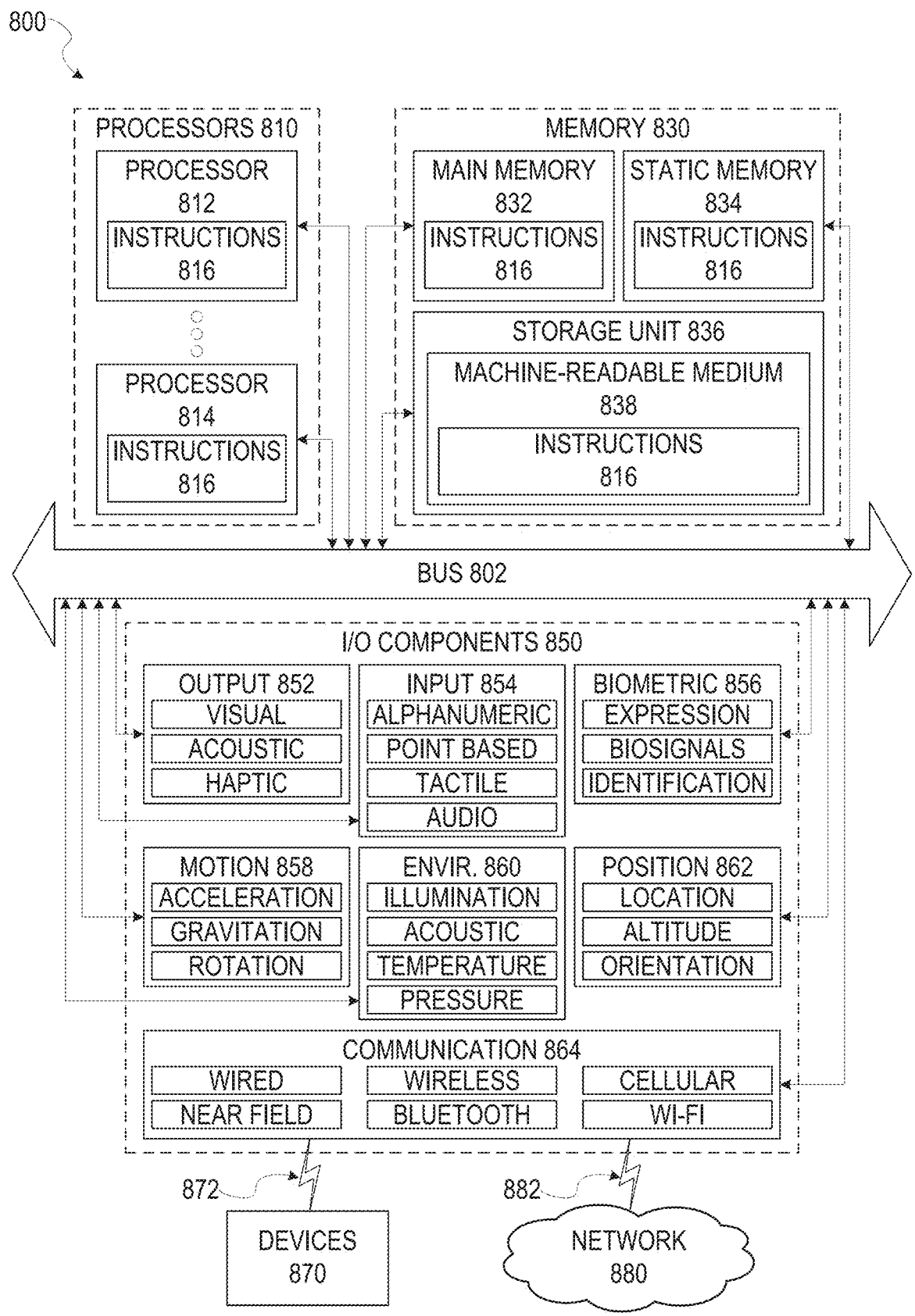
FIG. 8 is a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine 130, server system 102, API server 120, content generation server 124, etc. or a computing device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor; and
   memory including instructions that, when executed, cause the at least one processor to:
      determine a relevancy score for respective ones of a plurality of sporting event data items based on navigational attributes of a vehicle, the navigational attributes including at least one of a location of the vehicle, vehicle sensor data, or vehicle navigational data;
      determine whether the navigational attributes correspond to a driving condition, the driving condition indicative of a driving pattern of the vehicle in response to a condition external to the vehicle; and in response to determining that the navigational attributes correspond to the driving condition, present a first sporting event data item of the plurality of sporting event data items in response to a relevancy score of the first sporting event data item corresponding to the driving condition.

2. The system of claim 1, wherein the at least one processor is to:
access first data from one or more biometric sensors monitoring a user operating the vehicle, the first data corresponding to expressions of the user including at least one of a hand expression, a facial expression, or a vocal expression;
access second data from the one or more biometric sensors, the second data corresponding to biosignals of the user including at least one of a blood pressure, a heart rate, a body temperature, a perspiration, or a brain wave;
access third data from the one or more biometric sensors, the third data to identify the user by at least one of voice identification, retinal identification, facial identification, fingerprint identification, or electroencephalogram-based identification; and
determine whether an emotional state of the user is calm, neutral, or agitated based on at least one of the first data, the second data, or the third data.

3. The system of claim 1, wherein the at least one processor is to:
determine an emotional state associated with a user operating the vehicle based on data from one or more biometric sensors monitoring the user;
select one or more sporting event data items of the plurality of sporting event data items based on at least one of the navigational attributes, a respective relevancy score of the one or more sporting event data items, or the emotional state, the one or more sporting event data items including the first sporting event data item; and
in response to the determining that the emotional state is an agitated emotional state, select the first sporting event data item to present to the user based on the first sporting event data item having a high relevancy score.

4. The system of claim 1, wherein the at least one processor is to:
determine a user emotional state of a user operating the vehicle, the determining including:
analyzing eye tracking data;
analyzing a user heart rate;
analyzing sensor data from a user seat to determine user motion; and
determining that the user emotional state is calm, neutral, or agitated based on at least one of the eye tracking data, the user heart rate, or the sensor data from the user seat; and
based on a determination that the user emotional state is agitated, select the first sporting event data item when the relevancy score of the first sporting event data item is a high relevancy score.

5. The system of claim 1, wherein the driving condition is a high-maintenance driving condition, and the at least one processor is to:
determine whether the navigational attributes correspond to a neutral driving condition or a low-maintenance driving condition; and
in response to determining that the navigational attributes correspond to the neutral driving condition, present second sporting event data items including the first sporting event data item when relevancy scores for respective ones of the second sporting event data items are less than the relevancy score of the first sporting event data item.

6. The system of claim 5, wherein the relevancy scores are first relevancy scores, and the at least one processor is to:
in response to determining that the navigational attributes correspond to the low-maintenance driving condition, present third sporting event data items including the first sporting event data item and the second sporting event data items when second relevancy scores for respective ones of the third sporting event data items are less than the first relevancy scores and the relevancy score of the first sporting event data item.

7. A non-transitory computer readable storage medium comprising instructions that, when executed, cause a computing device associated with a vehicle to at least:
determine a relevancy score for respective ones of a plurality of sporting event data items based on navigational attributes of the vehicle, the navigational attributes including at least one of a location of the vehicle, vehicle sensor data, or vehicle navigational data;
determine whether the navigational attributes correspond to a driving condition, the driving condition indicative of a driving pattern of the vehicle in response to a condition external to the vehicle; and
in response to determining that the navigational attributes correspond to the driving condition, present a first sporting event data item of the plurality of sporting event data items in response to a relevancy score of the first sporting event data item corresponding to the driving condition.

8. The non-transitory computer readable storage medium of claim 7, wherein the instructions, when executed, cause the computing device to obtain the plurality of sporting event data items from a server computer.

9. The non-transitory computer readable storage medium of claim 7, wherein the instructions, when executed, cause the computing device to:
access first data from one or more biometric sensors monitoring a user operating the vehicle, the first data corresponding to expressions of the user including at least one of a hand expression, a facial expression, or a vocal expression;
access second data from the one or more biometric sensors, the second data corresponding to biosignals of the user including at least one of a blood pressure, a heart rate, a body temperature, a perspiration, or a brain wave;
access third data from the one or more biometric sensors, the third data to identify the user by at least one of voice identification, retinal identification, facial identification, fingerprint identification, or electroencephalogram-based identification; and
determine whether an emotional state of the user is calm, neutral, or agitated based on at least one of the first data, the second data, or the third data.

10. The non-transitory computer readable storage medium of claim 7, wherein the instructions, when executed, cause the computing device to:
determine an emotional state associated with a user operating the vehicle based on data from one or more biometric sensors monitoring the user;
select one or more sporting event data items of the plurality of sporting event data items based on at least one of the navigational attributes, a respective relevancy score of the one or more sporting event data items, or the emotional state, the one or more sporting event data items including the first sporting event data item; and in response to the determining that the emotional state is an agitated emotional state, select the first sporting event data item to present to the user based on the first sporting event data item having a high relevancy score.

11. The non-transitory computer readable storage medium of claim 7, wherein the instructions, when executed, cause the computing device to:

determine a user emotional state of a user operating the vehicle, the determining including:
analyzing eye tracking data;
analyzing a user heart rate;
analyzing sensor data from a user seat to determine user motion; and
determining that the user emotional state is calm, neutral, or agitated based on at least one of the eye tracking data, the user heart rate, or the sensor data from the user seat; and based on a determination that the user emotional state is agitated, select the first sporting event data item when the relevancy score of the first sporting event data item is a high relevancy score.

12. The non-transitory computer readable storage medium of claim 7, wherein the driving condition is a high-maintenance driving condition, and the instructions, when executed, cause the computing device to:

determine whether the navigational attributes correspond to a neutral driving condition or a low-maintenance driving condition; and
in response to determining that the navigational attributes correspond to the neutral driving condition, present second sporting event data items including the first sporting event data item when relevancy scores for respective ones of the second sporting event data items are less than the relevancy score of the first sporting event data item.

13. The non-transitory computer readable storage medium of claim 12, wherein the relevancy scores are first relevancy scores, and the instructions, when executed, cause the computing device to:

in response to determining that the navigational attributes correspond to the low-maintenance driving condition, present third sporting event data items including the first sporting event data item and the second sporting event data items when second relevancy scores for respective ones of the third sporting event data items are less than the first relevancy scores and the relevancy score of the first sporting event data item.

14. An apparatus comprising:

first means for determining a relevancy score for respective ones of a plurality of sporting event data items based on navigational attributes of a vehicle, the navigational attributes including at least one of a location of the vehicle, vehicle sensor data, or vehicle navigational data;

second means for determining whether the navigational attributes correspond to a driving condition, the driving condition indicative of a driving pattern of the vehicle in response to a condition external to the vehicle; and means for presenting a first sporting event data item of the plurality of sporting event data items in response to a relevancy score of the first sporting event data item corresponding to the driving condition, the means for presenting the first sporting event data item in response to determining that the navigational attributes correspond to the driving condition.

15. The apparatus of claim 14, further including means for obtaining the plurality of sporting event data items from a server computer.

16. The apparatus of claim 14, further including:

means for accessing to access:
first data from one or more biometric sensors monitoring a user operating the vehicle, the first data corresponding to expressions of the user including at least one of a hand expression, a facial expression, or a vocal expression;
second data from the one or more biometric sensors, the second data corresponding to biosignals of the user including at least one of a blood pressure, a heart rate, a body temperature, a perspiration, or a brain wave; and
third data from the one or more biometric sensors, the third data to identify the user by at least one of voice identification, retinal identification, facial identification, fingerprint identification, or electroencephalogram-based identification; and third means for determining whether an emotional state of the user is calm, neutral, or agitated based on at least one of the first data, the second data, or the third data.

17. The apparatus of claim 14, further including:

third means for determining an emotional state associated with a user operating the vehicle based on data from one or more biometric sensors monitoring the user; and means for selecting to select:
one or more sporting event data items of the plurality of sporting event data items based on at least one of the navigational attributes, a respective relevancy score of the one or more sporting event data items, or the emotional state, the one or more sporting event data items including the first sporting event data item; and
in response to the determining that the emotional state is an agitated emotional state, the first sporting event data item to present to the user based on the first sporting event data item having a high relevancy score.

18. The apparatus of claim 14, further including third means for determining a user emotional state of a user operating the vehicle by:
analyzing eye tracking data;
analyzing a user heart rate;
analyzing sensor data from a user seat to determine user motion; and
determining that the user emotional state is calm, neutral, or agitated based on at least one of the eye tracking data, the user heart rate, or the sensor data from the user seat; and based on a determination that the user emotional state is agitated, means for selecting the first sporting event data item when the relevancy score of the first sporting event data item is a high relevancy score.

19. The apparatus of claim 14, wherein the driving condition is a high-maintenance driving condition, and the second means for determining is to determine whether the navigational attributes correspond to a neutral driving condition or a low-maintenance driving condition, and the means for presenting is to, in response to determining that the navigational attributes correspond to the neutral driving condition, present second sporting event data items including the first sporting event data item when relevancy scores for respective ones of the second sporting event data items are less than the relevancy score of the first sporting event data item.

20. The apparatus of claim 19, wherein the relevancy scores are first relevancy scores, and the means for presenting is to, in response to determining that the navigational attributes correspond to the low-maintenance driving condition, present third sporting event data items including the first sporting event data item and the second sporting event data items when second relevancy scores for respective ones of the third sporting event data items are less than the first relevancy scores and the relevancy score of the first sporting event data item.

\* \* \* \* \*